(12) United States Patent
Marusich et al.

(10) Patent No.: US 11,574,084 B1
(45) Date of Patent: Feb. 7, 2023

(54) METHODS AND SYSTEMS FOR GEOMETRIC ANALYSIS OF A PART FOR MANUFACTURE

(71) Applicant: PROTOLABS, INC., Maple Plain, MN (US)

(72) Inventors: Troy David Marusich, Eden Prairie, MN (US); Shuji Usui, Minneapolis, MN (US)

(73) Assignee: PROTOLABS, INC., Maple Plain, MN (US)

( * ) Notice: Subject to any disclaimer, the term of this patent is extended or adjusted under 35 U.S.C. 154(b) by 0 days.

(21) Appl. No.: 17/589,009

(22) Filed: Jan. 31, 2022

(51) Int. Cl.
*G06F 30/10* (2020.01)
*G06F 30/27* (2020.01)

(52) U.S. Cl.
CPC ............ *G06F 30/10* (2020.01); *G06F 30/27* (2020.01)

(58) Field of Classification Search
CPC .................. G06F 30/10; G06F 30/27
See application file for complete search history.

(56) References Cited

U.S. PATENT DOCUMENTS

| | | | | |
|---|---|---|---|---|
| 6,134,338 | A * | 10/2000 | Solberg | G06V 30/422 382/113 |
| 7,266,419 | B2 | 9/2007 | Sakai et al. | |
| 9,177,085 | B2 * | 11/2015 | Snyder | G06F 30/13 |
| 10,831,179 | B2 | 11/2020 | Byers et al. | |
| 10,909,358 | B2 * | 2/2021 | Mirho | G06T 5/002 |
| 11,113,431 | B2 * | 9/2021 | Xu | G06F 30/10 |
| 2020/0033833 | A1 | 1/2020 | Teng et al. | |
| 2020/0096967 | A1 | 3/2020 | Sykes et al. | |
| 2020/0218858 | A1 | 7/2020 | Sawyer et al. | |
| 2020/0302091 | A1 * | 9/2020 | Hamazoe | G06F 30/10 |
| 2020/0349303 | A1 | 11/2020 | Burton | |
| 2021/0178697 | A1 | 6/2021 | Nilakantan | |
| 2022/0157017 | A1 * | 5/2022 | Du | G06T 17/10 |

OTHER PUBLICATIONS

Jabal, M., et al. "A Comparative Study on Extraction and Recognition Method of CAD Data from CAD Drawings" IEEE Int'l Conf. on Information Management & Engineering, pp. 709-713 (2009) (Year: 2009).*
Intwala, A. "Image to CAD: Feature Extraction and Translation of Raster Image of CAD Drawing to DXF CAD Format" Computer Vision & Image Processing, pp. 205-215 (2019) (Year: 2019).*
Beate Scheibel, Juergenmangler, Stefanierinderle-Ma, Extraction of dimension requirements from engineering drawings for supporting quality control in production processes, Mar. 24, 2021.

* cited by examiner

*Primary Examiner* — Jay Hann
(74) *Attorney, Agent, or Firm* — Caldwell Intellectual Property Law, LLC

(57) ABSTRACT

A method for geometric analysis of a part for manufacture, the method including receiving, by a processor, a computer model of a part for manufacture; receiving, by the processor, a print of the part for manufacture; extracting, by the processor, a semantic datum from the print of the part for manufacture; mapping, by the processor, the semantic datum on the computer model of the part for manufacture; and generating, by the processor, a manufacturing instruction based on the semantic datum mapped on the computer model of the part for manufacture.

20 Claims, 6 Drawing Sheets

METHODS AND SYSTEMS FOR GEOMETRIC ANALYSIS OF A PART FOR MANUFACTURE

FIELD OF THE INVENTION

The present invention generally relates to the field of computer-aided design and structure fabrication. In particular, the present invention is directed to methods and systems for geometric analysis of a part for manufacture.

BACKGROUND

Computer-aided drawings typically convey information about a to-be-fabricated structure, such as a part or an assembly of components of a part. However, information in computer-aided drawings sometimes cannot be extracted with available software.

SUMMARY OF THE DISCLOSURE

In an aspect of the disclosure is a method for geometric analysis of a part for manufacture, the method including receiving, by a processor, a computer model of a part for manufacture; receiving, by the processor, a print of the part for manufacture; extracting, by the processor, a sematic datum from the print of the part for manufacture; mapping, by the processor, the semantic datum on the computer model of the part for manufacture; and generating, by the processor, a manufacturing instruction based on the semantic datum mapped on the computer model of the part for manufacture.

In another aspect of the disclosure is a system for geometric analysis of a part for manufacture, the system including a processor configured to: receive a computer model of a part for manufacture; receive a print of the part for manufacture; extract a semantic datum from the print of the part for manufacture; map the semantic datum on the computer model of the part for manufacture; and generate a manufacturing instruction based on the semantic datum mapped on the computer model of the part for manufacture.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for geometric analysis of a part for manufacture at a processor, which receives a computer model of a part for manufacture and print of the part for manufacture. The computer model may include a three-dimensional image of the part for manufacture, and the print may include a two-dimensional image of the part for manufacture. The print includes semantic datum, which the processor is configured to extract from the print and map onto the computer model. The processor is further configured to generate a manufacturing instruction based on the semantic datum mapped on the computer model of the part for manufacture. The print may be a file type that does not readily permit extraction of semantic datum, such as a PDF or DXF, DWG file. The processor may recognize the semantic datum, associate the corresponding component of the part for manufacture, and identify the same component of the part for manufacture in the computer model to map the semantic datum on the computer model.

Each manufacturing process used may be any suitable process, such as, subtractive manufacturing, additive manufacturing, and forming manufacturing. Examples of manufacturing processes that may be used include, but are not limited to, rotary-tool milling, drilling, turning, electronic discharge machining, ablation, etching, erosion, cutting, cleaving, 3D printing, injection molding, casting, stamping, forming, depositing, extruding, sintering, among others. Fundamentally, there is no limitation on the type of manufacturing process(es) used.

In some embodiments, the equipment used for manufacturing a part, such as adding, removing, and/or forming material may be of the computerized numerical control (CNC) type that is automated and operates by precisely programmed commands that control movement of one or more parts of the equipment to effect the material. CNC machines, their operation, programming, and relation to computer aided manufacturing (CAM) tools and computer aided design (CAD) tools are well known and need not be described in detail herein for those skilled in the art to understand the scope of the present invention and how to practice it in any of its widely varying forms.

Figure 1:
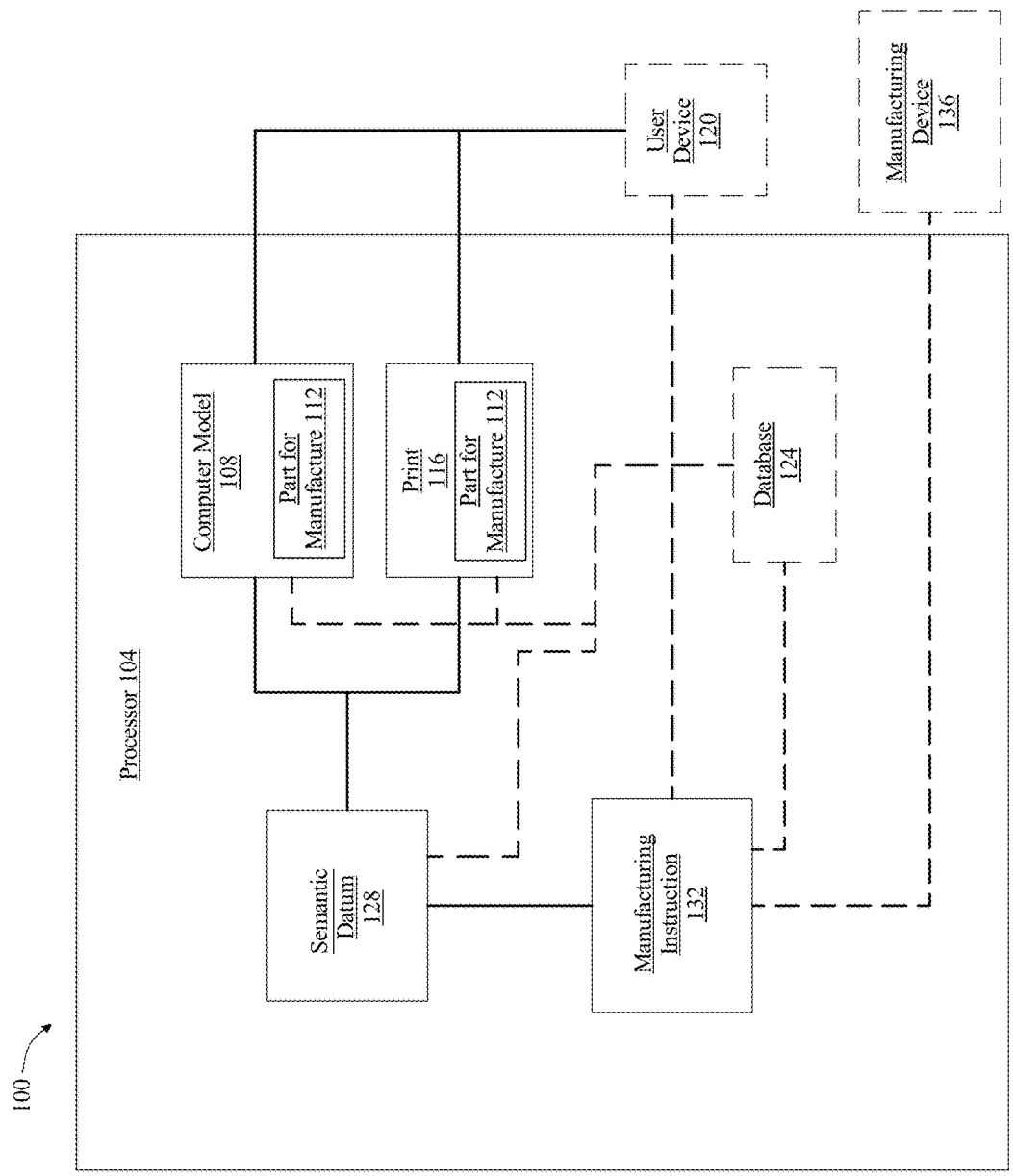
FIG. 1 is a high-level block diagram illustrating an embodiment of a system for generating an instant design for manufacturability of a part at a computing device.

Referring now to FIG. 1, a block diagram of system 100 for geometric analysis of a part for manufacture is illustrated. System 100 is configured to generate a manufacturing instruction based on a semantic datum, extracted from a print of the part for manufacture, mapped on a computer model of the part for manufacture. System 100 includes a processor 104. Processor 104 may include any computing device as described in this disclosure, including without limitation, a microcontroller, and/or microprocessor as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of processors and/or computing devices in a first location and a second computing device or cluster of computing devices in a second location. Processor 104 may include one or more processors dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of system 100 and/or computing device.

Processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, processor 104 is configured to receive a computer model 108 of a part for manufacture 112. Computer model 108 may include a plurality of sides.

A "part for manufacture," as used in this disclosure, is a part to be manufactured, wherein manufacturing may include any manufacturing process as described in the entirety of this disclosure. The part may include any item made of materials such as metals including, for example, aluminum and steel alloys, brass, and the like, plastics, such as nylon, acrylic, ABS, Delrin, polycarbonate, and the like, foam, composites, wood, etc. A "computer model", as described herein, is a digital model of a physical structure as created using computer-aided design (CAD) modeling software. Computer model 108 may include a three-dimensional image of part for manufacture 112. As used in this disclosure, a "three-dimensional image" is an image having, appearing to have, or displaying three dimensions, such as length, width, and height. For example and without limitation, computer-aided design (CAD) software may include SOLIDWORKS® software and/or CATIA software (available from Dassault Systèmes SolidWorks Corp, Waltham, Mass.), AUTOCAD® software and/or Fusion 360 software (available from Autodesk, Inc., San Rafael, Calif.), PTC Creo software (available from PTC, Inc., Boston, Mass.), Siemens NX software (available from Siemens PLM Software, Plano, Tex.) and MICROSTATION® software (available from Bentley Systems, Inc., Exton, Pa.), and the like. Computer model 108 may further include any data describing and/or relating to a computer model of a part to be manufactured. Computer model 108 may include any modeling type, such as, without limitation, a wireframe, solid model and/or any combination thereof. Computer model 108 may be saved in a computer file using any suitable file protocol, such as, without limitation, SolidWorks part file (.SLDPRT), several SolidWorks part files organized into a single assembly (.SLDASM), 3D assembly file supported by various mechanical design programs (.STP), graphics file saved in a 2D/3D vector format based on the Initial Graphics Exchange Specification (.IGS) and/or the like. Computer model 108 may further include information about the geometry and/or other defining properties of the structure of part for manufacture 112. Computer model 108 may include a polygon mesh, such as a collection of vertices, edges, and faces, that define the shape of computer model 108. For example and without limitation, the faces of the polygon mesh may include triangles, such as a triangle mesh, quadrilaterals, or other simple convex polygons.

Still referring to FIG. 1, computer model 108 may include a plurality of sides of part for manufacture 112. Each side of the plurality of sides, as used in this disclosure, may be a view of computer model 108 from a plane orthogonal to an axis passing through an origin of computer model 108. The axis may include, as a non-limiting example, a three-axis coordinate system, such as the x-axis, y-axis, and z-axis, or abscissa, ordinate, and applicate. The axis may include, as a further non-limiting example, any axis as a function of the origin. Persons skilled in the art, upon reviewing the entirety of this disclosure, will be aware of axis which may be suitable for use as each side of the plurality of sides consistently with this disclosure. The origin of the computer model, as described herein, is a fixed point of reference for computer model 108. For example and without limitation, the origin may include the center of mass, the geometric center, the center of a feature of the part, wherein a feature may be a hole, a well, a groove, a pocket, a channel, extruded volume, and the like. As a further example and without limitation, the origin may include any position of computer model 108.

Continuing to refer to FIG. 1, computer model 108 may include semantic information of part for manufacture 112.

"Semantic information", as described in this disclosure, is data concerning and/or describing product and manufacturing information (PMI) and/or product life cycle management (PLM). PMI, as used in this disclosure, is data describing non-geometric attributes of a model of a part for manufacture, such as computer model 108, necessary for manufacturing the part, components of the part, and associated assemblies. For example and without limitation, PMI may include geometric dimensions and tolerances, 3D annotation and dimensions, surface finish, material specifications, and the like. PMI may include textual data, such as alphanumeric, punctuation, typographical symbols, character, string data, and/or any textual data as described in the entirety of this disclosure. PLM, as used in this disclosure, is any data concerning and/or describing management of the lifecycle of the part from inception, through engineering design and manufacture, to service and disposal of the manufactured part. PLM may include textual data, such as alphanumeric, punctuation, typographical symbols, character, string data, and/or any textual data as described in the entirety of this disclosure. In an embodiment, semantic information included in computer model 108 may be used in processes for pricing a part to be manufactured.

With continued reference to FIG. 1, processor 104 is configured to receive a print 116 of part for manufacture 112. Print 116 may be any two-dimensional print 116 of part for manufacture 112, such that the two-dimensional print 116 may include any data describing the part for manufacture 112. As used in this disclosure, "two-dimensional" means having, appearing to have, or displaying two out of the three dimensions length, width, and height. Print 116 may include semantic information of part for manufacture 112. Print 116 may include geometric dimensioning and tolerancing (GD&T) information, which may be provided in one or more software files such as DXF files, DWG files, PDF files, and/or the like. Print 116 may be received with computer model 108 of part for manufacture 112 or received in a separate transmission and/or from another source. Processor 104 may receive computer model 108 and/or print 116 from a user device 120. User device 120 may include, without limitation, a transmission of communication with at least a server; transmission may include any transmission as described herein. A user device 120 may include an additional computing device, such as a mobile device, laptop, desktop computer, or the like; as a non-limiting example, the user device 120 may be a computer and/or workstation operated by an engineering professional. Persons skilled in the art, upon reviewing the entirety of this disclosure, will be aware of various devices which may be suitable for use as user device 120 consistently with this disclosure. Computer model 108 and/or print 116 may be stored in a database 124, which may be in system 100 or remote. Database 124 may store information pertaining to, for example, a request for a part to be manufactured, various machines used in manufacturing, materials used to manufacture the part, and the like. Database 124 is described in more detail below in reference to FIG. 3. Print 116 and/or computer model 108 may be retrieved from memory and/or database 124.

Continuing to refer to FIG. 1, database 124 may be implemented, without limitation, as a relational database, a key-value retrieval datastore such as a NOSQL database, or any other format or structure for use as a datastore that a person skilled in the art would recognize as suitable upon review of the entirety of this disclosure. Dataset may be stored in any suitable data and/or data type. For instance and without limitation, dataset may include textual data, such as numerical, character, and/or string data. Textual data may include a standardized name and/or code for in-process and/or post-processing manufacturing, or the like; codes may include raw material codes, dimensional codes, calibration codes, mechanical and/or thermal testing codes, safety codes, and/or data formatting codes, which may include without limitation codes used in CAD 3D geometry, assembly and PMI standards such as STEP AP242 and ASME Y14.5 geometric dimensioning and tolerancing (GD&T) symbols. In general, there is no limitation on forms textual data or non-textual data used as dataset may take; persons skilled in the art, upon reviewing the entirety of this disclosure, will be aware of various forms which may be suitable for use as dataset consistently with this disclosure.

Still referring to FIG. 1, processor 104 is configured to extract a semantic datum 128 from print 116 of part for manufacture 112. As used in this disclosure, "semantic datum" is an element of data describing and/or identifying semantic information in and/or from a print of a part for manufacture. Semantic datum 128 may include geometric dimensions and tolerances such as geometric tolerance, 3D annotation and dimensions, surface roughness, surface finish, material specifications, PMI, PLM, and the like. As used in this disclosure, a "geometric tolerance" is a quantified limit of allowable error of one or more physical attributes of a part for manufacture. Semantic datum 128 may include a form tolerance such as straightness, flatness, circularity, and/or cylindricity; a profile tolerance such as profile of a line and/or profile of a surface; an orientation tolerance such as angularity, perpendicularity, and/or parallelism; location tolerance such as position, concentricity and/or symmetry; a runout tolerance such as circular runout and/or total runout; and the like. Semantic datum 128 may be included in print 116 of part for manufacture 112 as symbols, annotations, numerical values, text, embedded information, and/or the like. As used in this disclosure, "text" includes letters, numbers, and/or symbols. Print 116 may include an image representing part for manufacture 112 or a component of the part for manufacture 112, a number representing a numerical tolerance of the component, and/or an indicator that identifies the numerical tolerance is associated with the component. Print 116 may also indicate a unit of measurement and/or a scale, which may be included in semantic datum 128 or on which semantic datum 128 may be based. For example, print 116 may state that the dimensions are in inches, list the scale as "2:1", include a circle representing an exterior cylindrical surface of part for manufacture 112, and have an arrow pointing from "R0.5000+/−0.0003" to the circle. Processor 104 may be configured to recognize "+/−" as a symbol representing a tolerance for the preceding number in the amount of the succeeding number. Processor 104 may also be configured to identify the arrow and that it is point from the numbers to the circle and determined that the tolerance is for the circle, specifically the radius of the circle. Processor 104 may be configured to identify the unit of measurement stated in print 116 and determine that the radius tolerance for the circle is +/−0.0003 inches. Processor 104 may also be configured to identify measurement scale and adjust numbers, including semantic datum 128, accordingly. Processor 104 may be configured to determine scale by comparing an annotation of measurement to an actual length in print 116. In some embodiments, processor 104 may recognize encoding in a file of print 116 as representing semantic datum 128 and may extract semantic datum 128 from the file.

With continued reference to FIG. 1, processor 104 may be configured to extract semantic datum 128 utilizing a machine-learning process. Processor 104 may be configured to use a machine-learning model, which may be trained on the processor 104 or another device. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. Machine-learning model is described in more detail below in reference to FIG. 2. Extraction training data may correlate inputs and outputs. Extraction training data is a plurality of data entries containing a plurality of inputs that are correlated to a plurality of outputs for training a processor by a machine-learning process to extract semantic datum. Extraction training data may contain inputs which may include shapes, symbols, annotations, text, embedded information, and/or the like that contain semantic information, such as GD&T information, as discussed above and may include the associated measurements and components of part for manufacture 112. Extraction training data may contain outputs which may include semantic datum 128. Extraction training data may be collected by recording from prints 116 the shapes, symbols, annotations, text, embedded information, and/or the like that contain tolerance information and the corresponding semantic datum 128 that was extracted from them. Extraction training data may be stored in database 124, and processor 104 may be communicatively connected to database 124. For example, extraction training data may correlate an "R" followed by a first number, "+/−", followed by a second number; a circle adjacent to the numbers; and an arrow pointing from the numbers to the circle with semantic datum 128 including a radius tolerance for the circle in the amount of the second number. Extraction training data may be collected from journal articles, publicly available information, manual extractions of semantic data from prints, iterations of a machine-learning process, self-learning, and the like. Processor 104 may utilize machine-learning process and output semantic datum 128 based on one or more inputs discussed above and extraction training data.

Still referring to FIG. 1, system 100, such as processor 104 and/or a computing device communicatively connected to the processor 104, may be configured to identify an image in print 116 and/or computer model 108 as representing part for manufacture 112. As used herein, "communicatively connected" is a process whereby one device, component, or circuit is able to receive data from and/or transmit data to another device, component, or circuit. Processor 104 may be configured to extract geometric dimensions of part for manufacture 112 including height, length, width, radius, depth, and/or the like and may be configured to extract their corresponding location, such as their coordinates. Processor 104 may also be configured to recognize lines including line segments and planes; shapes such as circles, arcs, ovals, ellipsis, polygons, irregular shapes, cylinders, segments of shapes, and the like; and/or markings; determine whether they are included in part for manufacture 112; extract their coordinates and measurements relative to a coordinate system in print 116 and/or computer model 108; and associate the coordinates and measurements with their corresponding component of part for manufacture 112. For example, processor 104 may be configured to recognize that an image in print 116 and/or computer model 108 is a circle; determine that it is an image representing part for manufacture 112; extract a center position, such as in x,y,z coordinates, and radius of the circle; and associate the center position and radius with the circle. Processor 104 may also be configured to recognize images in print 116 and/or computer model 108 as not representing part for manufacture 112 and excluding them such as, for example, lines identifying a coordinate system, annotation lines, centering marks, true position symbols, center lines, and the like. Print 116 and/or computer model 108 may include information identifying coordinates of the image. Print 116 and/or computer model 108 may identify that a center mark is not included with the image, which processor 104 may recognize and exclude the center mark from image representing part for manufacture 112. As another example, processor 104 may be configured to recognize an arc in print 116 is an arc, determine that the arc is a component of image representing part for manufacture 112 and should be included in the part for manufacture 112; extract the arc center, x,y,z coordinates, and angle; and associate the arc center, x,y,z coordinates, and angle with the arc. Coordinates and/or measurements of a component of part for manufacture 112 may be calculated based on information in print 116.

With continued reference to FIG. 1, processor 104 is configured to map semantic datum 128 on computer model 108 of part for manufacture 112. Mapping may include inserting in computer model 108 semantic datum 128 from print 116. Mapping may include positioning semantic datum 128 in computer model 108 such that the semantic datum 128 aligns with the component of part for manufacture 112 in the computer 108 with which the semantic datum 128 concerns. As used in this disclosure, a "component" of a part for manufacture is a feature, part, and/or piece of the part for manufacture. For example, mapping may include inserting a semantic datum 128 of a hole radius with an arrow that was pointing to the hole in the image of the part for manufacture 112 in print 116 into computer model 108 such that the arrow points to the corresponding hole in the image of the part for manufacture 112 in the computer model. Processor 104 may be configured to compare dimensions and/or coordinates of components of part for manufacture 112 in print 116 and computer model 108 and associate the same components to transfer semantic datum 128 extracted from the print 116 onto the computer model 108. Association may include matching one or more measurements and/or descriptions of a component in print 116 with a component in computer model 108 including, without limitation, coordinates, height, length, width, radius, position on part for manufacture 112, and/or the like. For example, processor 104 may associate a circle in print 116 to a cylinder in computer model 108 by comparing their corresponding radii, coordinates, and/or other measurements. As another example, processor 104 may associate a circle designated by a position GD&T symbol assigned to a 0.5 diameter in print 116 to the only cylinder with a 0.25 radius in computer model 108. Print 116 may include a concentricity GD&T symbol assigned to a 0.75 inch hole in print 116, which processor 104 may associate with the only 0.375 inch radius hole in computer model 108. Once components of part for manufacture 112 in print 116 are associated with their corresponding components of the part for manufacture 112 in computer model 108, then processor 104 may map semantic datum 128 on the computer model 108 while maintaining their relation to the corresponding measurements of the components. Similarly, processor 104 may associate a line in print 116 with a surface of part for manufacture 112 in computer model 108 by, for example, comparing the length of the line with the length of the surface and/or comparing the positions of the line and surface on the corresponding images of part for manufacture 112 and/or in relational position to other components of the part for manufacture 112. As an additional example, mapping semantic datum 128 on computer model 108 of the part for manufacture may further comprise associating a line of the print 116 of the part for manufacture to a plane of the computer model 108 of the part for manufacture. In some embodiments, processor 104 mapping semantic datum 128 on computer model 108 may include superimposing computer model 108, which may be a three-dimensional image of part for manufacture 112, onto print 116, which may include a two-dimensional image of the part for manufacture 112 and the original semantic datum 128, such that the three-dimensional image is positioned on the two-dimensional image. As used in this disclosure, "superimposing" is placing or laying an image or information over another image or information. For example, superimposing a three-dimensional image of part for manufacture 112 onto print 116 may include placing or laying the three-dimensional image of the part for manufacture 112 onto the image of the part for manufacture 112 in the print 116. Thus, the semantic datum 128 on print 116 may align with the corresponding components of computer model 108 of part for manufacture 112. In some embodiments, processor 104 may align an outer profile of a three-dimensional image of part for manufacture 112 in computer model 108 with an outer profile of a two-dimensional image of part for manufacture 112 in print 116.

Still referring to FIG. 1, processor 104 may be configured to import computer model 108, print 116, and/or information therein such as semantic datum 128 from a first at least a file to a second at least a file, wherein the second at least a file may include a format or file type distinct from the first at least a file. Semantic datum 128 may be imported as a block or unit with a unique tag, which may identify the type and/or origin of semantic datum 128 imported. Processor 104 may be configured to associate semantic datum 128 to corresponding components and/or measurements of part for manufacture 112 based on the tag. Processor 104 may be configured to recognize different types of lines, shapes, symbols including without limitation GD&T symbols, annotations, embedded text, and the like and extract information from the recognition. In some embodiments, the recognition is based on identifying standardized formatting. For example, processor 104 may be configured to recognize a line by a unique symbol in print 116 as a center line type. Processor 104 may then extract that the location of the line is the center of part for manufacture 112. As another example, processor 104 may be configured to identify a line segment in print 116 as identifying a distance between two locations on part for manufacture 112 and recognize that the line segment is not the part for manufacture 112. Processor 104 may identify numbers by the line segment and associate the number with the line segment and the two locations on part for manufacture 112. Processor 104 may be configured to map semantic datum 128 on computer model 108 utilizing a machine-learning process. Processor 104 may be configured to use a machine-learning model, which may be trained on the processor 104 or another device. Map training data may correlate inputs and outputs. Map training data is a plurality of data entries containing a plurality of inputs that are correlated to a plurality of outputs for training a processor by a machine-learning process to map semantic datum 128 on computer model 108. Map training data may include inputs, which may include semantic datum 128. Map training data may include outputs, which may include position of semantic datum 128 on computer model 108. Map training data may contain a plurality of data entries containing a plurality of inputs correlated to a plurality of outputs. Map training data may be collected by recording extracted semantic datum 128 from prints 116 and their corresponding position on computer model 108. Map training data may be collected from journal articles, publicly available information, manual mappings of semantic data from prints onto computer models, iterations of a machine-learning process, self-learning, and the like. Map training data may be stored in database 124. Processor 104 may utilize machine-learning process and output position of semantic datum 128 on computer model 108 based on that same semantic datum 128 inputted and extraction training data. Machine-learning process may be implemented like any machine-learning process as described in more detail below in reference to FIG. 2. The machine-learning process using map training data may be distinct from the machine-learning process using extraction training data. Map training data may be used to train this particular machine-learning process.

Still referring to FIG. 1, system 100 may include graphics processing unit (GPU) operating on processor 104. A "GPU", as used in this disclosure, is a device with a set of specific hardware capabilities that are intended to map well to the way that various 3D engines execute their code, including geometry setup and execution, texture mapping, memory access, and/or shaders. GPU may be a processor, wherein a processor may include any processor as described in the entirety of this disclosure. GPU may include, without limitation, a specialized electronic circuit designed to rapidly manipulate and alter memory to accelerate the creation of images in a frame buffer. For instance, and without limitation, GPU may include a computer chip that performs rapid mathematical calculations, primarily for the purpose of rendering images. GPU may further include, without limitation, full scene anti-aliasing (FSAA) to smooth the edges of 3-D objects and anisotropic filtering (AF) to make images look crisper. GPU may include, without limitation, dedicated graphics cards, integrated graphics cards, hybrid graphics cards, and/or any combination thereof. GPU may be configured to map semantic datum 128 on computer model 108.

Still referring to FIG. 1, processor 104 is configured to generate a manufacturing instruction 132 based on semantic datum 128 mapped on computer model 108 of part for manufacture 112. As used in this disclosure, "manufacturing instructions" are instructions to manufacture a part for manufacture. Manufacturing instruction 132 may include any data describing and/or identifying instructions to manufacture part for manufacture 112, such that manufacturing the part will produce a completed manufactured part. Manufacturing instruction 132 may include all necessary instructions to manufacture part for manufacture 112. The part may be manufactured utilizing any suitable manufacturing process, such as subtractive manufacturing, additive manufacturing, injection molding, 3D printing, and the like. Manufacturing instruction 132 may include text based on semantic datum 128, such as instructions for a user that are easier to read than semantic datum 128. Manufacturing instruction 132 may include instructions not detailed in semantic datum 128 that achieve manufacturing part for manufacture 112 within tolerance limits in semantic datum 128. Manufacturing instruction 132 may include machine instructions based on semantic datum 128 for one or more machines to execute to manufacture part for manufacture 112. Processor 104 may be configured to generate manufacturing instruction 132 utilizing a machine-learning process. Processor 104 may be configured to use a machine-learning model, which may be trained on the processor 104 or another device. Instruction training data may correlate inputs and outputs. Instruction training data is a plurality of data entries containing a plurality of inputs that are correlated to a plurality of outputs for training a processor by a machine-learning process to generate a manufacturing instruction. Instruction training data may include inputs, which may include semantic datum mapped on computer model. Instruction training data may include outputs, which may include the corresponding manufacturing instructions. Instruction training data may contain a plurality of data entries containing a plurality of inputs correlated to a plurality of outputs. Instruction training data may be collected by recording semantic data mapped on computer models 108 and their corresponding manufacturing instructions. Instruction training data may be collected from journal articles, publicly available information, manual generation of manufacturing instructions based on semantic datum on computer models, iterations of a machine-learning process, self-learning, and the like. Instruction training data may be stored in database 124. Processor 104 may utilize machine-learning process and output manufacturing instruction 132 based on inputted semantic datum 128 mapped on computer model 108 and instruction training data. Machine-learning process may be implemented like any machine-learning process as described in more detail below in reference to FIG. 2. The machine-learning process using map training data may be distinct from the machine-learning process using extraction training data. Map training data may be used to train this particular machine-learning process. Processor 104 may be configured to transmit manufacturing instruction 132 to a manufacturing device 136. Manufacturing device 136 is a computing device configured to implement the manufacturing instruction 132 to manufacture part for manufacture 112. Manufacturing device 136 may be communicatively connected to one or more machines to manufacture part for manufacture 112 including, but not limited to, milling equipment and/or spark-erosive devices.

Continuing to refer to FIG. 1, system 100 may include an assignment module operating on GPU. Assignment module may include any hardware and/or software module. Assignment module may be configured to determine at least an orientation of computer model 108. Orientation, as described herein, is a plane parallel to the direction of machining the part, wherein the plane may be positioned on any direction. The direction, as described herein, may include any axis as described in the entirety of this disclosure. The axis may include, as a non-limiting example, a three-axis coordinate system, such as the x-axis, y-axis, and z-axis, or abscissa, ordinate, and applicate. As a further non-limiting example, the axis may include a five-axis system, such as two rotation axis, x-axis, y-axis, and z-axis. The axis may include, as a further non-limiting example, any rotational axis as a function of the origin. In order to machine the entirety of the part, the at least an orientation needs to include planes to ensure all features of computer model 108 are machined wherein features include any feature as described in the entirety of this disclosure. For example and without limitation, a cylindrical part may be machined in its entirety from the at least an orientation consisting of planes perpendicular to the rotational axis of the cylinder. As a further non-limiting example, a cylindrical part with a hole in one side may be machined in its entirety from the at least an orientation consisting on planes on perpendicular to the rotational axis of the cylinder and the radial axis. Persons skilled in the art, upon reviewing the entirety of this disclosure, will be aware of various planes which may be suitable for use the at least an orientation consistently with this disclosure.

Continuing to refer to FIG. 1, determining each orientation of the plurality of orientations may further include generating a geodesic representative part model, wherein the geodesic representative part model includes the representative part model encased in a geodesic polygon. The "geodesic sphere", as described herein, is a computer model of a sphere, wherein the sphere is comprised of triangular elements. For example and without limitation, the triangular elements of the geodesic sphere may include any frequency of triangles. Further the triangular elements may be arranged in orientation, as a non-limiting example, the orientations may include a platonic solid, such as a tetrahedron, hexahedron, octahedron, dodecahedron, and an icosahedron. The representative part model may be encased in the geodesic sphere forming the geodesic representative part model. The representative part model may be oriented inside the geodesic sphere such that the entirety of the representative part model is within the geodesic sphere. As an example and without limitation, the representative part model may be oriented such that the origin of the representative part model is aligned with the origin of the geodesic sphere. Persons skilled in the art, upon reviewing the entirety of this disclosure, will be aware of various models which may be suitable for use the geodesic representative part model consistently with this disclosure.

With continued reference to FIG. 1, determining each orientation of the plurality of orientations may further include computing a thickness direction datum of the geodesic representative part model. The "thickness direction datum", as described herein, is the minimum distance between two parallel planes which enclose the representative part model within the geodesic representative part model in a given direction. Further, determining each orientation of the plurality of orientations may further include computing an accessibility cone represented by the geodesic sphere. The "accessibility cone", as described herein, is the tool reachable orientation from the location of the part. The geodesic sphere may include, for example and without limitation, any geodesic sphere as described in the entirety of this disclosure. For example and without limitation, the direction may include any axis as described in the entirety of this disclosure, such as an x-axis, y-axis, z-axis, and/or any rotational axis. As an example and without limitation, in 3-axis milling the z-axis may be assigned to compute the thickness direction datum. As a further example and without limitation, in 5-axis milling a rotational axis may be assigned to the direction in the accessibility cone. In an embodiment and without limitation, in 5-axis milling any axis may be assigned to the direction in the accessibility cone. In an embodiment, computing the accessibility cone includes performing ray tracing, such as reverse order ray tracing, wherein rays of light are traced from the surface of the part in the direction of the geodesic sphere. In the embodiment, ray tracing further includes determining visibility directions, wherein the visibility direction is a ray of light that does not contact the surface of the part. Ray tracing may include any methodology of ray tracing as described herein. Further, in the embodiment, ray tracing further includes conducting a tool reachability test on the GPU as a function of the visibility directions. For example and without limitation, the tool reachability test may include a collision test, gouge test, and the like. In an embodiment and without limitation, the visibility cone may be narrowed by taking into account the tool holder collision against the workpiece. In the embodiment, the milling orientation may be configured to be selected from the visibility cone. The visibility cone may include any visibility information as described in the entirety of this disclosure. In an embodiment and without limitation, any visibility information as described in the entirety of this disclosure, can be stored in the geodesic sphere and/or in the rasterized depth image of the representative part. In an embodiment, determining each orientation of the plurality of orientations may include computing a bitonic sorting algorithm. The bitonic sorting algorithm, as described herein, is a parallel sorting algorithm that performs $O(\log^2(n))$ comparisons. For example and without limitation, the bitonic sorting algorithm utilizes the thickness direction datum and a dominant surface normal. The dominant surface normal, as described herein, is the largest surface normal direction of each direction of the part. As an example and without limitation, the dominant surface normal is the z-axis when the z-height increase remains under 2× and the surface area is larger than the 20% of the XY plane projected area of the representative part model. Persons skilled in the art, upon reviewing the entirety of this disclosure, will be aware of various distances which may be suitable for use as the thickness direction datum consistently with this disclosure.

System 100 may include a simulation module operating on GPU. Simulation module may include any hardware and/or software module. Simulation module may be configured to generate a prospective part. A "prospective part", as used in this disclosure, is a computer model of computer model 108 that has been optimized for manufacturing. Optimization may be the design of computer model 108 that has the lowest manufacturing costs. In an embodiment, simulation module may utilize digital filters, as described herein, to perform the tool offset and the tool back offset operations, wherein the digital filter computes a new depth for each pixel as a function of the neighboring pixels. Tool offset is defined as the offset distance and tool back offset is defined as the material removal computation. Tool offset operates by exhausting all possible tool paths for the given tool, and tool back offset operates by simulating the machined surface for the tool offset and which gives the least amount of the left-over materials for the given tool. Digital filters may be applied to each side of the plurality of sides of computer model 108 wherein each filter is representative of a different milling tool. For example and without limitation, milling tools may include diameters of ¼", ⅛", 1/16", 1/32", and the like. As the diameter of the milling tool increases, the amount of tool offset distance increases.

With continued reference to FIG. 1, in an embodiment, generating prospective part is further configured to include generating a simulated casing of computer model 108, wherein generating a simulated casing further includes generating a simulated view for each side of the plurality of sides of the computer model 108 and superimpose each simulated view of the plurality of simulated views of the computer model 108 over the computer model 108; simulated views may be superimposed over each other, for instance by iteratively modifying computer model 108 and/or a copy thereof with each new superimposition. In an embodiment, superimposing views of computer model 108 create simulated casing of the computer model 108. A "simulated view", as used in this disclosure, is a side of the plurality of sides of computer model 108, wherein the side has digital filters of one or more different milling tools applied. A "simulated casing", as used in this disclosure, is an aggregate of each simulated view of a plurality of simulated views of computer model 108 wherein the simulated casing displays a super position of each machined surface of the plurality of machined surfaces of computer model 108. Persons skilled in the art, upon reviewing the entirety of this disclosure, will be aware of various simulated views which may be suitable for use in in a simulated casing consistently with this disclosure.

Continuing to refer to FIG. 1, in an embodiment, generating prospective part is further configured to fill at least a void space of the simulated casing of computer model 108. The at least a void space, as defined herein, is the space defined by the by each simulated view of the plurality of simulated views of computer model 108. In an embodiment, filling the void space of the simulated casing of computer model 108 may further include removing the simulated casing of computer model 108 from the filled void space of the simulated casing of computer model 108. Removing the simulated casing of computer model 108 from the filled void space of the simulated casing of computer model 108 may include separating only the filled void space of the simulated casing of computer model 108. For example and without limitation, removing the simulated casing of computer model 108 may include erasing the simulated casing of representative model 108, wherein erasing the simulated casing leaves only the filled void space of computer model 108 visible. In an embodiment, for example and without limitation, the filled void space of computer model 108 may be used to generate instant design for manufacturability.

Still referring to FIG. 1, dataset may be stores as image data, such as for example an image of a particular CNC mechanical part, such as a computer model of a threaded bolt, a computer-aided design of a stainless-steel endcap, or a tool path of a hollow box. Image data may be stored in various forms including for example, joint photographic experts group (JPEG), exchangeable image file format (Exif), tagged image file format (TIFF), graphics interchange format (GIF), portable network graphics (PNG), netpbm format, portable bitmap (PBM), portable any map (PNM), high efficiency image file format (HEIF), still picture interchange file format (SPIFF), better portable graphics (BPG), drawn filed, enhanced compression wavelet (ECW), flexible image transport system (FITS), free lossless image format (FLIF), graphics environment manage (GEM), portable arbitrary map (PAM), personal computer exchange (PCX), progressive graphics file (PGF), gerber formats, 2 dimensional vector formats, 3 dimensional vector formats, compound formats including both pixel and vector data such as encapsulated postscript (EPS), portable document format (PDF), SolidWorks part file (.SLDPRT), several SolidWorks part files organized into a single assembly (.SLDASM), 3D assembly file supported by various mechanical design programs (.STP), graphics file saved in a 2D/3D vector format based on the Initial Graphics Exchange Specification (.IGS) and stereo formats.

With continued reference to FIG. 1, in an embodiment, system 100 may be configured to display prospective part to user device 120. Displaying may include any means of displaying as described in the entirety of this disclosure. Displaying prospective part to user device 120 may further comprise verifying, by the user at user device 120, prospective part. Verifying may include, for example and without limitation, any means of confirmation, such as viewing prospective part and selecting a button. Persons skilled in the art, upon reviewing the entirety of this disclosure, will be aware of various confirmations which may be suitable for use as verifying consistently with this disclosure.

Figure 2:
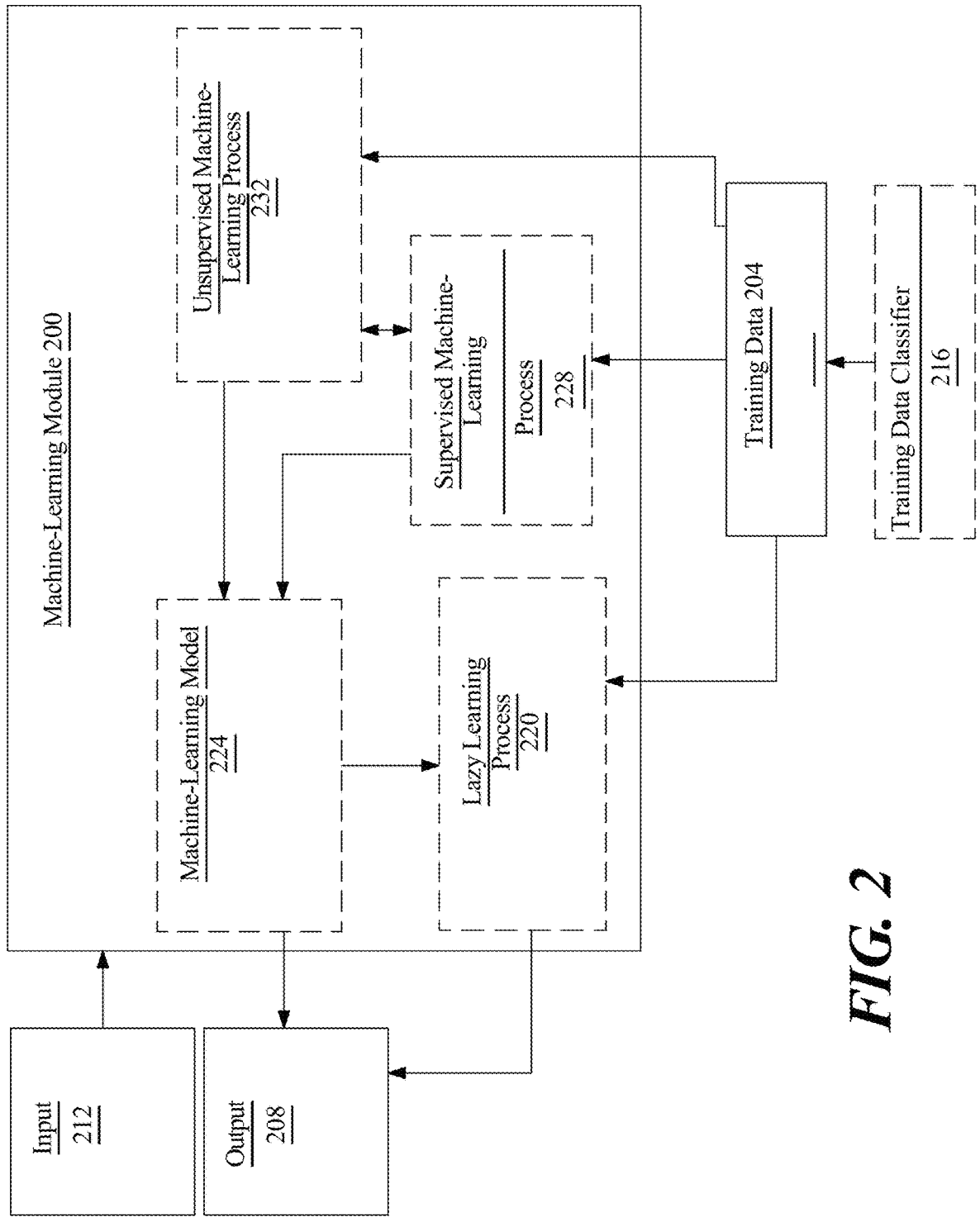
FIG. 2 illustrates a block diagram of an embodiment of a machine-learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatically uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs described in this disclosure as inputs, outputs described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
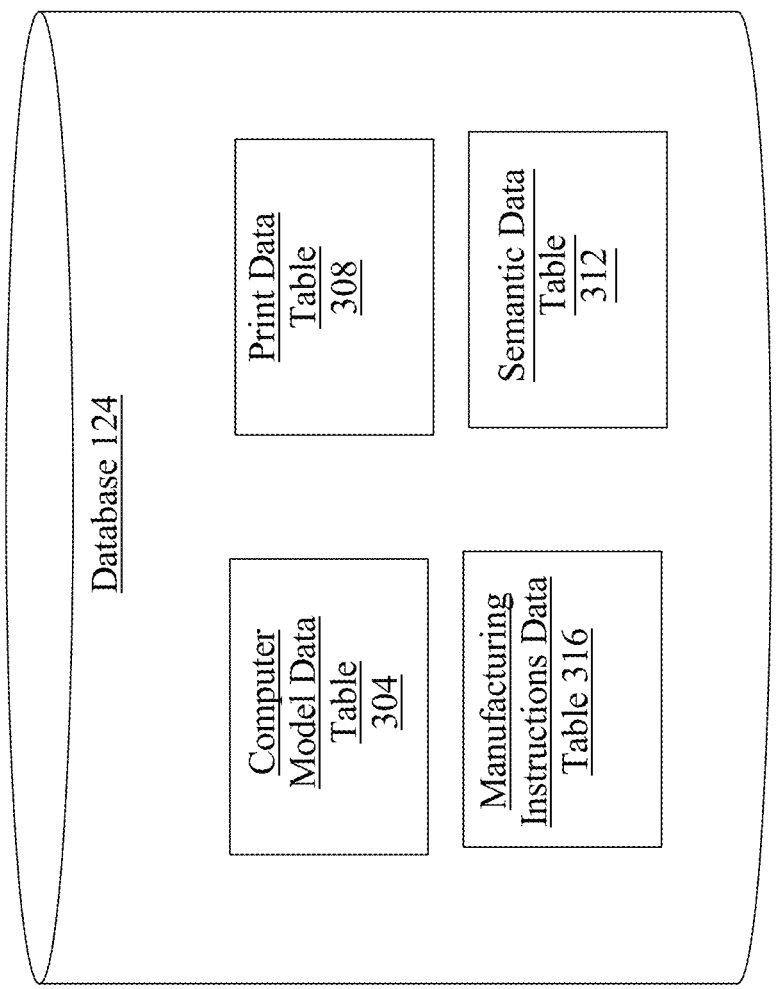
FIG. 3 is a block diagram illustrating an embodiment of an internal database.

Referring now to FIG. 3, an embodiment of database 124 is illustrated. Database 124 may be implemented as a hardware and/or software module. Database 124 may be implemented, without limitation, as a relational database, a key-value retrieval datastore such as a NOSQL database, or any other format or structure for use as a datastore that a person skilled in the art would recognize as suitable upon review of the entirety of this disclosure. Database 124 may contain datasets that may be utilized by unsupervised machine-learning model 200 to find trends, cohorts, and shared datasets between data contained within database 124 and computer model 108. In an embodiment, datasets contained within database 124 may be categorized and/or organized according to shared characteristics. For instance and without limitation, one or more tables contained within database 124 may include representative part model data table 300, wherein computer model data table 304 may include stored computer model 108. As a further example and without limitation, one or more tables contained within database 124 may include print data table 308, wherein print data table 308 may include stored print 116.

With continued reference to FIG. 3, one or more tables contained within database 124 may include semantic data table 312. Semantic data table 312 may include extraction training data. As discussed above, extraction training data may include shapes, symbols, annotations, text, embedded information, and/or the like that contain semantic information as discussed above including the associated measurements and components of part for manufacture 112, and corresponding semantic datum 128. Semantic data table 312 may include map training data. Map training data may include semantic data and their corresponding positions on computer model.

Still referring to FIG. 3, one or more tables contained within database 124 may include manufacturing instruction data table 316. Manufacturing instruction data table 316 may include datasets classified by the attributes of the part to be manufactured contained within computer model 108. The manufacturing instruction data table 316 may contain datasets describing material information, for example and without limitation, datasets describing metals, ASTM material standards, thermoplastics, thermosets, ceramics, graphite, biodegradable materials, medical and biochemical materials, nylons, acetals, polycarbonates, and the like. The manufacturing instruction data table 316 may further contain datasets describing part count data, such as datasets describing total amount of parts for manufacture, for example and without limitation, by directly matching the numbers of parts for manufacture in computer model 108, a range of numbers of parts for manufacture, a minimum and/or maximum threshold of numbers of parts for manufacture, and the like. The manufacturing instruction data table 316 may further contain datasets describing face count data, such as describing the total amount of faces on part for manufacture 112, for example and without limitation, by directly matching the number of faces on part for manufacture 112 contained within computer model 108, a range of number of faces on the part for manufacture 112, a minimum and/or maximum threshold of faces on the part for manufacture 112, and the like. The manufacturing instruction data table 316 may further contain datasets describing horizontal hole data, such as datasets describing the total number of horizontal holes contained in part for manufacture 112, for example and without limitation, by directly matching the number of horizontal holes on part for manufacture 112 contained in computer model 108, a range of numbers of horizontal holes in the part for manufacture 112, a minimum and/or maximum threshold of numbers of horizontal holes in the part for manufacture 112, and the like. The manufacturing instruction data table 316 may further contain datasets describing vertical hole count data, such as datasets describing the total number of vertical holes contained in part for manufacture 112, for example and without limitation, by directly matching the number of vertical holes on the part for manufacture 112 contained in computer model 108, a range of numbers of vertical holes in the part for manufacture 112, a minimum and/or maximum threshold of numbers of vertical holes in the part for manufacture 112, and the like. Manufacturing instruction data table 316 may include datasets classified by elements of the part of computer model 108. Manufacturing instruction data table 316 may include instruction training data. Instruction training data may include semantic datum 128 mapped on computer model and the corresponding manufacturing instructions for manufacturing part for manufacture 112 in the computer model.

Figure 4:
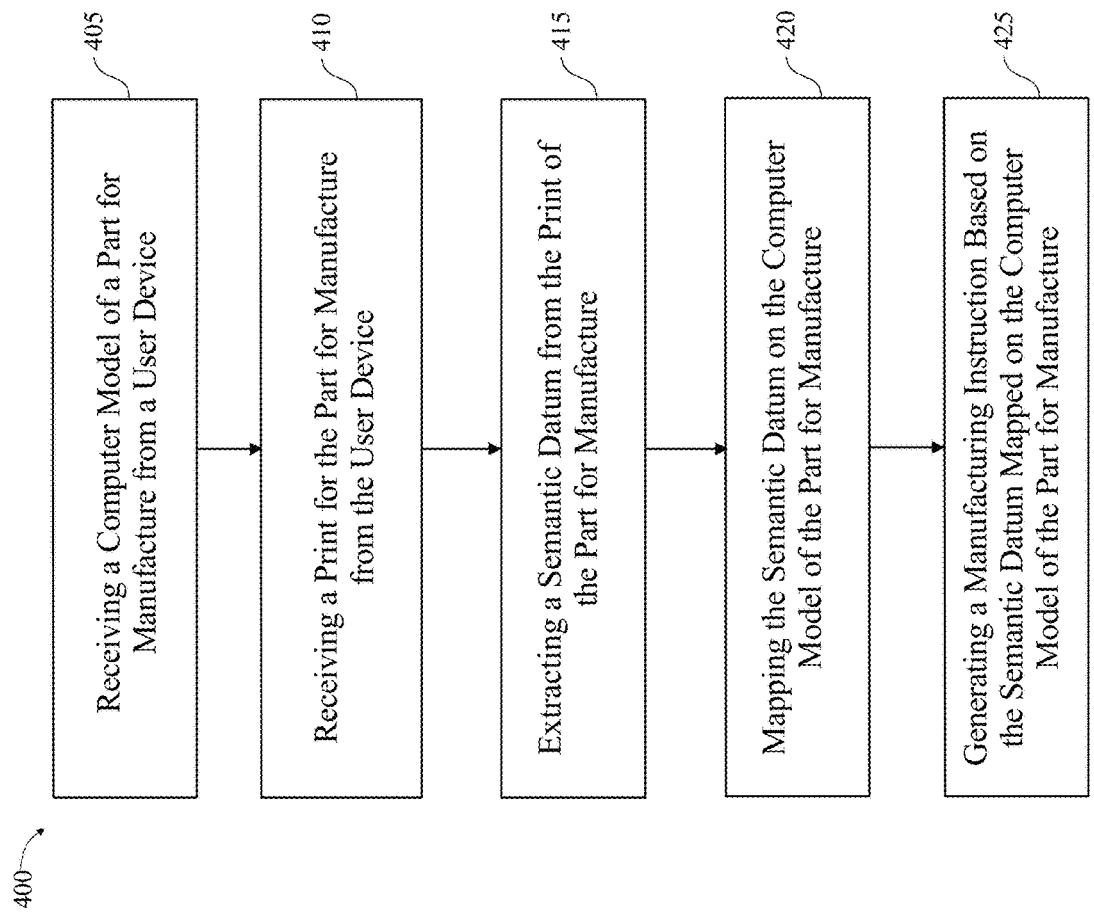
FIG. 4 is a process flow diagram illustrating an embodiment of a method for generating an instant design for manufacturability of a part at a computing device.

Referring now to FIG. 4, an embodiment of method 400 for geometric analysis of a part for manufacture is illustrated. At step 405, processor receives computer model of part for manufacture; this may be implemented, without limitation, as described above in reference to FIGS. 1-4. Processor may receive computer model from user device. Computer model may include a plurality of sides. Computer model may comprise a three-dimensional image of the part for manufacture. Computer model may be received by processor utilizing any of the network methodology as described herein. Computer model may include any computer model 108 as described herein. Each side of the plurality of sides, as described herein, may be the plane of each coordinate in axis passing through the origin of the representative part model. For example and without limitation, the axis may include a three-axis coordinate system, such as the x-axis, y-axis, and z-axis, or abscissa, ordinate, and applicate. As a further non-limiting example, the axis may include a five-axis system, such as two rotation axis, x-axis, y-axis, and z-axis. The axis may include, as a further non-limiting example, any rotational axis as a function of the origin, as described in further detail above in reference to FIG. 1. In an embodiment, computer model 108 may further include semantic information. Semantic information may include any semantic information as described above in further detail in reference to FIG. 1.

Still referring to FIG. 4, at step 410, processor receives print of part for manufacture; this may be implemented, without limitation, as described above in reference to FIGS. 1-4. Print may include a two-dimensional image of part for manufacture. Semantic datum from print may include text.

With continued reference to FIG. 4, at step 415, processor extracts semantic datum from print of part for manufacture; this may be implemented, without limitation, as described above in reference to FIGS. 1-4. Extracting semantic datum may utilize a machine-learning process.

Still referring to FIG. 4, at step 420, processor maps semantic datum on computer model of part for manufacture; this may be implemented, without limitation, as described above in reference to FIGS. 1-4. Mapping semantic datum on computer model of part for manufacture may include associating a line of print of part for manufacture to a plane of computer model of part for manufacture. Mapping semantic datum on computer model of part for manufacture may include associating semantic datum to a component of part for manufacture. Mapping semantic datum on computer model of part for manufacture may include superimposing computer model of part for manufacture on print of part for manufacture. Mapping semantic datum may be on a three-dimensional image of part for manufacture in computer model.

With continued reference to FIG. 4, at step 425, processor generates manufacturing instruction based on semantic datum mapped on computer model of part for manufacture;

this may be implemented, without limitation, as described above in reference to FIGS. 1-4. Manufacturing instruction may include all necessary data to manufacture part for manufacture. Generating manufacturing instruction may include text based on semantic datum.

Figure 5:
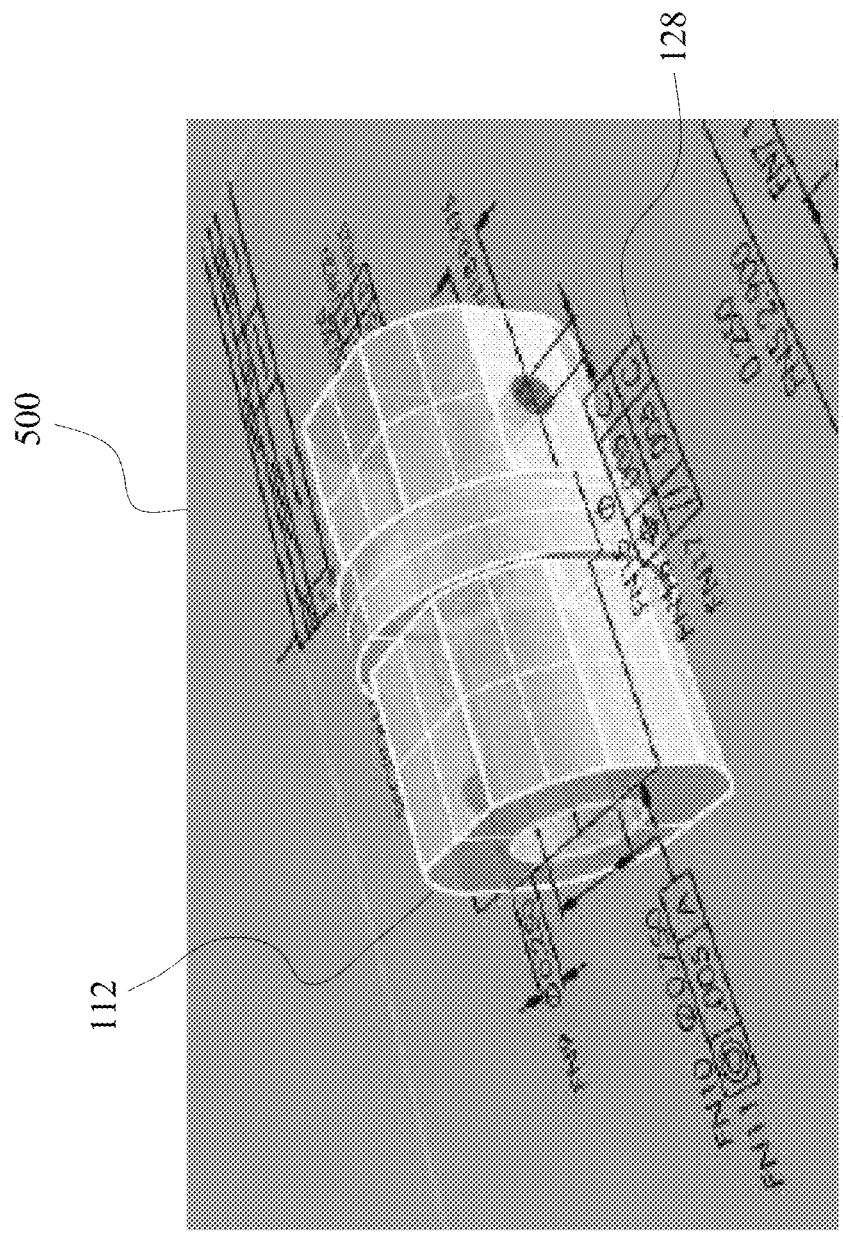
FIG. 5 is a screen shot of an exemplary embodiment of semantic datum mapped on a computer model.

Referring now to FIG. 5, an embodiment of semantic datum mapped on a computer model is illustrated. Computer model 500 includes a three-dimensional image of part for manufacture 112. Semantic datum 128 is mapped on computer model 500, as discussed in detail above pertaining to FIG. 1.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
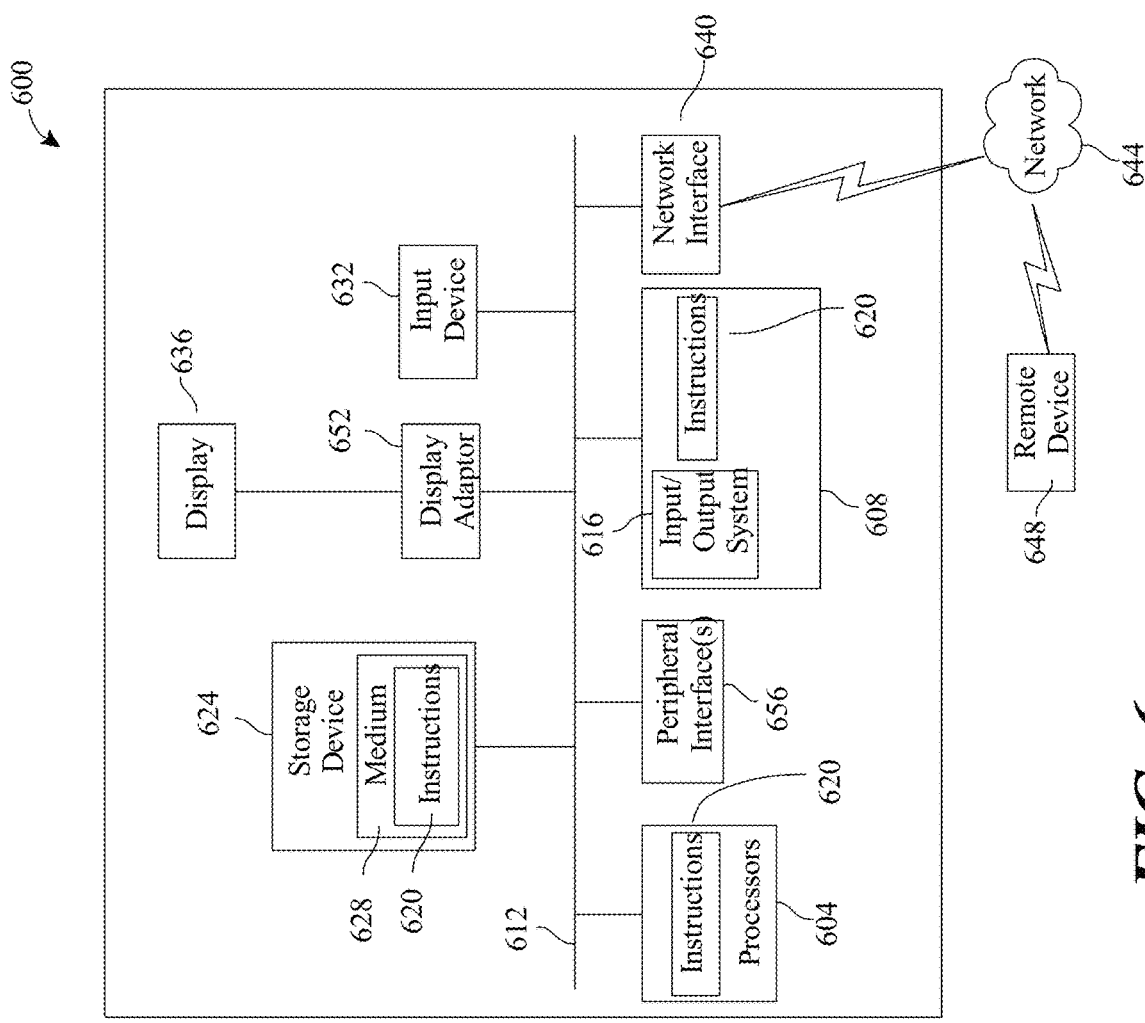
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for geometric analysis of a part for manufacture, the method comprising:
    receiving, by a processor, a computer model of a part for manufacture;
    receiving, by the processor, a print of the part for manufacture;
    extracting, by the processor, a semantic datum from the print of the part for manufacture;
    mapping, by the processor, the semantic datum on the computer model of the part for manufacture, wherein mapping comprises:
        receiving map training data, wherein the map training data correlates semantic data to a visual position of semantic data on computer models;
        training a machine-learning model with the map training data, and
        mapping, through the machine-learning model, the semantic datum on the computer model of the part for manufacture; and
    generating, by the processor, a manufacturing instruction based on the semantic datum mapped on the computer model of the part for manufacture.

2. The method of claim 1, wherein mapping the semantic datum on the computer model of the part for manufacture further comprises associating a line of the print of the part for manufacture to a surface of the computer model of the part for manufacture.

3. The method of claim 1, wherein the print comprises a two-dimensional image of the part for manufacture.

4. The method of claim 1, wherein the semantic datum from the print comprises text.

5. The method of claim 1, wherein the mapping the semantic datum on the computer model of the part for manufacture comprises associating the semantic datum to a component of the part for manufacture.

6. The method of claim 1, wherein mapping the semantic datum on the computer model of the part for manufacture comprises superimposing the computer model of the part for manufacture on the print of the part for manufacture.

7. The method of claim 1, wherein extracting the semantic datum utilizes a machine-learning process.

8. The method of claim 1, wherein the computer model comprises a three-dimensional image of the part for manufacture.

9. The method of claim 1, wherein mapping the semantic datum is on a three-dimensional image of the part for manufacture in the computer model.

10. The method of claim 1, wherein generating the manufacturing instruction comprises text based on the semantic datum.

11. A system for geometric analysis of a part for manufacture, the system comprising:
a processor configured to:
receive a computer model of a part for manufacture;
receive a print of the part for manufacture;
extract a semantic datum from the print of the part for manufacture;
map the semantic datum on the computer model of the part for manufacture, wherein mapping comprises:
receiving map training data, wherein the map training data correlates semantic data to a visual position of semantic data on computer models;
training a machine-learning model with the map training data, and mapping, through the machine-learning model, the semantic datum on the computer model of the part for manufacture; and
generate a manufacturing instruction based on the semantic datum mapped on the computer model of the part for manufacture.

12. The system of claim 11, wherein the processor is configured to associate a line of the print of the part for manufacture to a surface of the computer model of the part for manufacture.

13. The system of claim 11, wherein the print comprises a two-dimensional image of the part for manufacture.

14. The system of claim 11, wherein the semantic datum from the print comprises text.

15. The system of claim 11, wherein the processor is configured to associate the semantic datum to a component of the part for manufacture.

16. The system of claim 11, wherein the processor is configured to superimpose the computer model of the part for manufacture on the print of the part for manufacture.

17. The system of claim 11, wherein the processor is configured to extract the semantic datum utilizing a machine-learning process.

18. The system of claim 11, wherein the computer model comprises a three-dimensional image of the part for manufacture.

19. The system of claim 11, wherein the processor is configured to map the semantic datum on a three-dimensional image of the part for manufacture in the computer model.

20. The system of claim 11, wherein the manufacturing instruction comprises text based on the semantic datum.

* * * * *